IMAGE

(12) United States Patent
Broughton

(10) Patent No.: US 10,247,367 B1
(45) Date of Patent: Apr. 2, 2019

(54) LIGHTING SYSTEM

(71) Applicant: Cooper Technologies Company, Houston, TX (US)

(72) Inventor: Kevin Charles Broughton, Sharpsburg, GA (US)

(73) Assignee: Cooper Technologies Company, Houston, TX (US)

(*) Notice: Subject to any disclaimer, the term of this patent is extended or adjusted under 35 U.S.C. 154(b) by 0 days.

(21) Appl. No.: 15/660,261

(22) Filed: Jul. 26, 2017

Related U.S. Application Data

(60) Provisional application No. 62/367,007, filed on Jul. 26, 2016.

(51) Int. Cl.

| | |
|---|---|
| *F21K 9/61* | (2016.01) |
| *F21K 9/68* | (2016.01) |
| *F21V 23/00* | (2015.01) |
| *F21K 9/20* | (2016.01) |
| *F21Y 103/10* | (2016.01) |
| *F21Y 115/10* | (2016.01) |
| *F21V 7/00* | (2006.01) |

(52) U.S. Cl.
CPC ................ *F21K 9/61* (2016.08); *F21K 9/20* (2016.08); *F21K 9/68* (2016.08); *F21V 23/009* (2013.01); *F21V 7/0091* (2013.01); *F21Y 2103/10* (2016.08); *F21Y 2115/10* (2016.08)

(58) Field of Classification Search
CPC ..... F21K 9/61; F21K 9/68; F21K 9/69; F21V 7/0025; F21V 2200/15; F21V 2200/20; G02B 6/0011; G02B 6/0023; G02B 6/0028; G02B 6/0068; G02B 6/0073; G02B 6/0091; G02F 1/133615
See application file for complete search history.

(56) References Cited

U.S. PATENT DOCUMENTS

| | | | | |
|---|---|---|---|---|
| 8,031,294 B2 * | 10/2011 | Kim | ..................... | G02B 6/0083 349/58 |
| 8,371,737 B2 * | 2/2013 | Wang | ................... | G02B 6/0068 362/612 |
| 8,888,350 B2 * | 11/2014 | Park | ....................... | F21V 21/00 362/249.01 |

(Continued)

FOREIGN PATENT DOCUMENTS

| | | | |
|---|---|---|---|
| JP | 4683875 B2 | * | 5/2011 |
| JP | 2011175752 A | * | 9/2011 |

*Primary Examiner* — Hargobind S Sawhney
(74) *Attorney, Agent, or Firm* — King & Spalding LLP

(57) ABSTRACT

A lighting system includes an optic that has at least two reflective surfaces that are oriented such that they face each other. Further, the lighting system includes a plurality of light emitting diodes that are disposed adjacent one end of the optic. Furthermore, the lighting system includes a lightguide that is disposed adjacent an opposite end of the optic such that an edge of the lightguide is retained within and disposed between the at least two reflective surfaces of the optic. The at least two reflective surfaces of the optic reflect and guide light emitted by the plurality of light emitting diodes to the edge of the lightguide. The light then couples into the lightguide through the edge and is guided towards an opposing edge of the light guide. The light exits the lightguide through the opposing edge and/or major surfaces of the lightguide.

17 Claims, 5 Drawing Sheets

(56) References Cited

U.S. PATENT DOCUMENTS

| | | | |
|---|---|---|---|
| 2007/0171673 A1* | 7/2007 | Song | G02B 6/0031 362/612 |
| 2010/0165235 A1* | 7/2010 | Lee | G02F 1/133308 349/58 |
| 2010/0208491 A1* | 8/2010 | Shin | G02B 6/0091 362/606 |
| 2011/0134364 A1* | 6/2011 | Neyama | G02F 1/133308 349/62 |
| 2011/0134371 A1* | 6/2011 | Shimojoh | G02B 6/0083 349/65 |
| 2012/0087150 A1* | 4/2012 | Hamada et al. | F21V 8/00 |
| 2012/0262643 A1* | 10/2012 | Kweon | G02B 6/0091 349/58 |
| 2013/0148058 A1* | 6/2013 | Zhu | G02B 6/0091 349/65 |
| 2013/0242600 A1* | 9/2013 | Franklin | G02B 6/0073 362/602 |
| 2014/0092630 A1* | 4/2014 | Franklin | G02B 6/0031 362/609 |
| 2014/0176861 A1* | 6/2014 | Yun | G02B 6/0031 349/62 |
| 2016/0363724 A1* | 12/2016 | Jung | G02B 6/0091 |
| 2017/0261676 A1* | 9/2017 | Teragawa | G02B 6/0031 |

* cited by examiner

LIGHTING SYSTEM

CROSS REFERENCE TO RELATED APPLICATIONS

This application claims priority to U.S. Provisional Patent Application No. 62/367,007 filed Jul. 26, 2016 in the name of Kevin Charles Broughton and entitled "Lighting System," the entire contents of which are hereby incorporated herein by reference.

TECHNICAL FIELD

Embodiments of the technology relate generally to a lighting system that includes a panel-shaped lightguide, and more particularly configurations in which light emitting diodes couple light into an edge of the lightguide and at least some of the coupled light exits the lightguide through an opposing edge of the lightguide.

BACKGROUND

With many conventional luminaires that incorporate edgelit lightguides, the light source needs to touch or be extremely close to an edge of the lightguide in order to achieve efficient transfer of light from the light source into the lightguide. When the light source includes light emitting diodes and the lightguide is formed of typical optical polymers, thermal properties of the optical polymer and the surface temperature of the light emitting diodes can limit the maximum drive current, and thus maximum light output, of the light emitting diodes. For example, the light emitting diodes may be constrained to operate at a relatively low light output so that the heat generated by the operation of the light emitting diodes does not adversely impact and damage the lightguide's polymeric material. The surface temperature of the light emitting diodes or the heat generated by operating the light emitting diodes can be reduced by using large heat sinks or similar bulky structures. However, with many compact systems, it can be impractical or undesirable to utilize such large heat sinks or other bulky structures for heat removal. Further, such large heat sinks or bulky structures may not be cost effective. An alternative to using the large heat sinks or similar structures is to space the light emitting diodes farther away from the edge of the lightguide. However, the spacing of the light emitting diodes from the edge of the lightguide may adversely affect the light transfer from the light emitting diode to the lightguide when undertaken with conventional technical approaches.

Accordingly, need exists for technology to space one or more light emitting diodes away from the lightguide while achieving appropriate light transfer into the lightguide. Need further exists to provide flexibility in the alignment between the light emitting diodes and the lightguide. Need further exits to manipulate the output of the lightguide based on manipulating the manner in which light is coupled into the lightguide.

SUMMARY

In one aspect, the present disclosure is related to a lighting system that has a lightguide. The lightguide includes a first face, a second face that is opposite the first face, and an edge that extends between the first face and the second face. The first face and the second face extend along a reference plane that is disposed midway between the first face and the second face and that extends through the edge. Further, the lighting system includes a row of light emitting diodes that are separated from the edge by an air gap, that extend along the edge, and that are configured to emit light. The lighting system also includes a plurality of reflective surfaces that extend along the row of light emitting diodes and are oriented to guide the emitted light across the air gap to couple the guided light into the lightguide via the edge.

In another aspect, the present disclosure is related to a lighting system that has a lightguide that comprises a panel of optical material extending along a reference plane. The panel includes a first face, a second face that is opposite the first face, a first edge that extends between the first face and the second face, and a second edge that is opposite the first edge and that extends between the first face and the second face. The first face extends along a first side of the reference plane and the second face extends along a second side of the reference plane, with the reference plane disposed midway between the first face and the second face so that the reference plane extends through the first edge and the second edge. Further, the lighting system includes a row of light emitting diodes disposed adjacent the first edge, with an air gap disposed between the row of light emitting diodes and the first edge, wherein the row of light emitting diodes is disposed on the first side of the reference plane. The lighting system also includes an optic that is disposed between the row of light emitting diodes and the first edge to couple light from the row of light emitting diodes through the first edge and into the lightguide, so that at least a portion of the coupled light propagates in the lightguide via internal reflection between the first face and the second face to pass through the second edge and exit the lightguide to create a light distribution that is biased relative to the reference plane.

The foregoing discussion is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

BRIEF DESCRIPTION OF THE FIGURES

The foregoing and other features and aspects of the present disclosure are best understood with reference to the following description of certain example embodiments, when read in conjunction with the accompanying drawings, wherein:

FIG. 1A illustrates a perspective view of the assembled lighting system 100, while FIG. 1B illustrates the lighting system 100 partially assembled. FIG. 1C illustrates a cross sectional view of the lighting system 100. In FIG. 1D, example light rays traces have been overlaid upon the cross sectional view of FIG. 1C;

In FIG. 2B, example light ray traces have been overlaid upon the view of FIG. 2A; In FIG. 3B, example light ray traces have been overlaid upon the view of FIG. 3A.

Figure 1A:
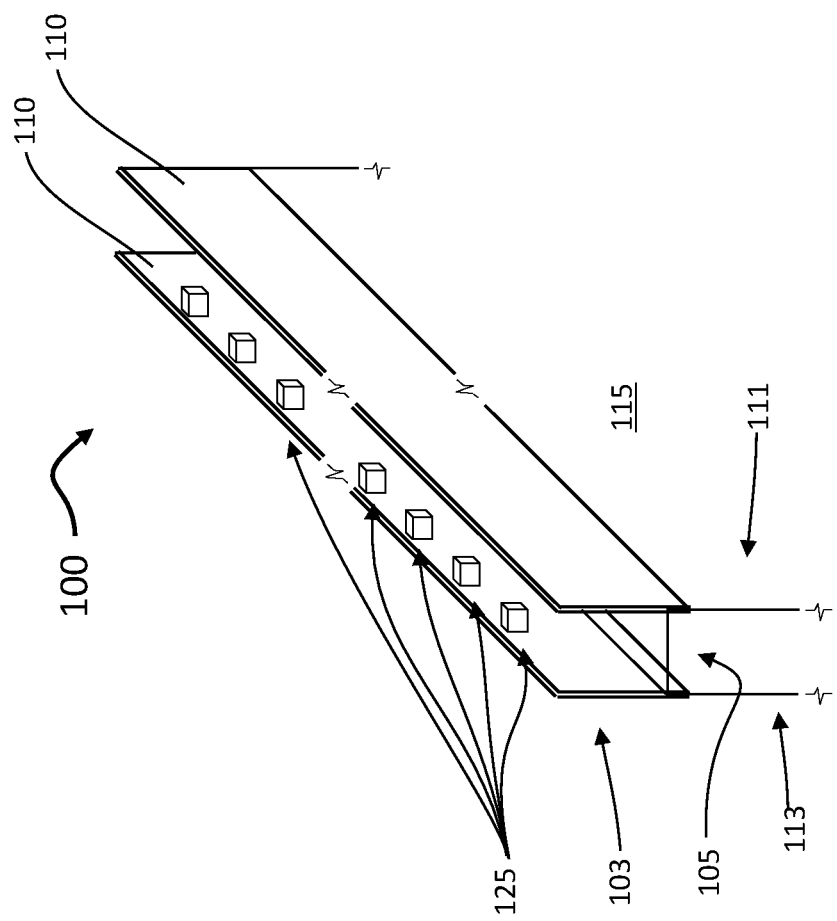
FIGS. 1A, 1B, 1C, and 1D (collectively FIG. 1) illustrate four views of a lighting system 100 according to some example embodiments of the disclosure.
Figure 1B:
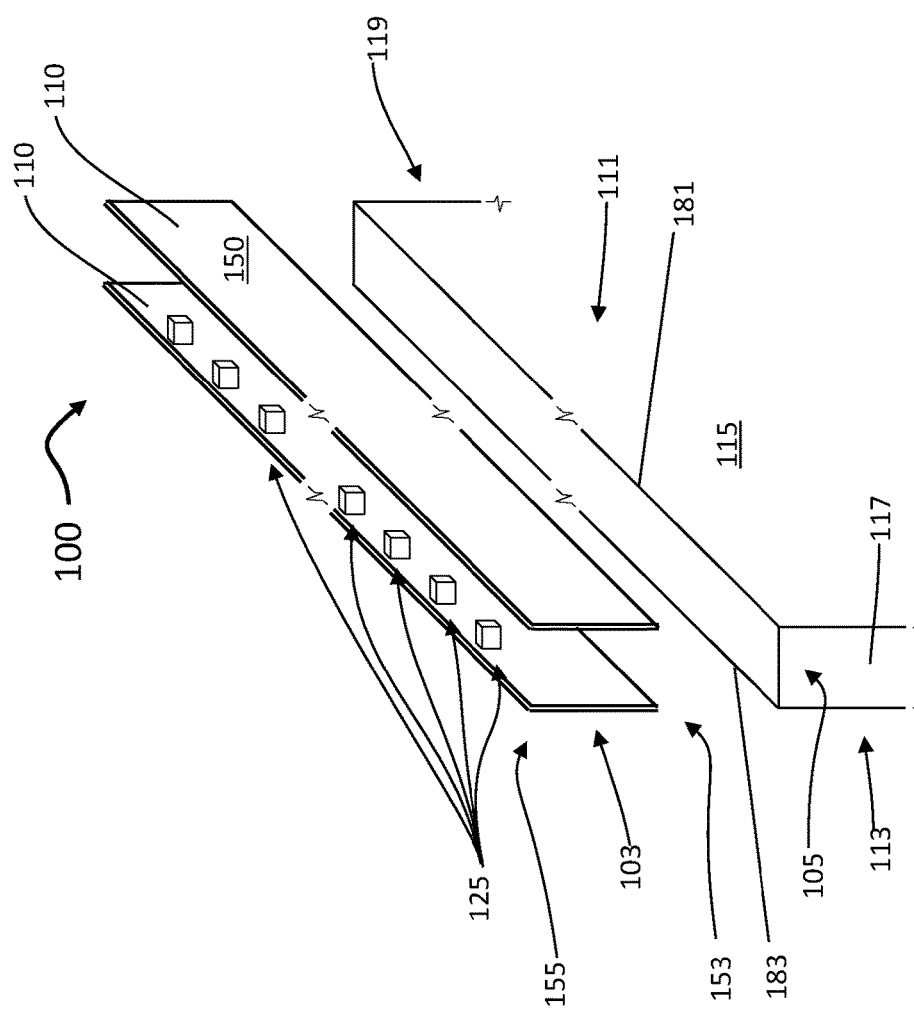

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes an optic that includes two or more surfaces that are configured to enclose a gap between a light emitting diode and an edge of a lightguide, where the light emitting diode is disposed above and at a distance from the edge of the lightguide. The two or more surfaces enclose the gap at least on two sides (e.g., major surface sides) of the lightguide. In one example, the two or more surfaces include two surfaces that face each other and are made of highly reflective material. The edge of the lightguide is disposed and securely retained in between the two surfaces adjacent one end of the two surfaces. Further, the two surfaces reflect light emitted from the light emitting diode disposed at an opposite end of the two surfaces to effectively transfer the light to the edge of the lightguide. The result is an enclosed system in which the light emitting diode can run at a higher drive current without damaging the lightguide, which would otherwise occur if the light emitting diode were in closer proximity to the edge of the lightguide. Additionally, the present disclosure allows flexibility in an alignment of the light emitting diode with respect to the lightguide along an axis parallel with the edge of the lightguide or relative to a centerline of the lightguide that is normal to the edge.

An example lighting system of the present disclosure includes a light source that is positioned adjacent a first edge of a lightguide that is panel-shaped. Further, the lighting system includes an optic that couples light from the light source into the lightguide through the first edge. The optic includes two or more reflective surfaces, for example. A portion of the coupled light can exit the lightguide through one or more major surfaces of the lightguide, while another portion of the coupled light can exit the lightguide through a second edge of the lightguide that is opposite the first edge. In one example, the light source is aligned with a centerline of the lightguide. However, in another example, the light source is laterally offset relative to a centerline of the lightguide. The lateral offset of the light source relative to the centerline of the lightguide causes a lateral offset of the light that exits the lightguide through the second edge of the lightguide. For example, the lighting system can emit a pattern of illumination that is biased relative to the centerline of the lightguide by offsetting an alignment of the light source with respect to the centerline of the lightguide. The illumination bias can comprise increased divergence, intensity, or ray angles on one side of the centerline relative to the other side of the centerline.

Representative embodiments of the lighting system with the optic will be described more fully hereinafter with example reference to the accompanying drawings that illustrate embodiments of the technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art. Furthermore, all "examples" or "example embodiments" given herein are intended to be non-limiting and among others supported by representations of the present technology.

Turning now to FIG. 1, an example lighting system 100 will be discussed in further detail and with comparative reference to the lighting system 200 illustrated in FIG. 2.

As best seen in the assembled view of FIG. 1A, the lighting system 100 comprises a panel-shaped lightguide 115. That is, the lightguide 115 has a substantially rectangular shaped profile and includes a first major surface 111 and a second major surface 113 opposite to the first major surface 111. The first and second major surfaces (111, 113) are bounded by two short edges (117, 119) and two long edges (105, 107). Further, the first major surface 111 joins the edge 105 at a first corner 181 and the second major surface 113 joins the edge 105 at a second corner 183. In some embodiments, one or both of the major surfaces (111, 113) of the lightguide 115 may be patterned with microlenses that help release the guided light from the lightguide 115 in a controlled fashion. The microlenses can comprise conical features, truncated cones, convex shapes, or other appropriate features, for example. Although the present disclosure describes a substantially rectangular shaped lightguide, one of ordinary skill in the art can understand and appreciate that in other example embodiments, the lightguide may have a triangular, octagonal, oval, circular, polygon, or any other appropriate form. In one example, the lightguide 115 can be made by cutting or molding a plate, slab, or panel of optical material and polishing the edges to an optical finish.

In addition to the lightguide 115, the lighting system 100 includes a row of light emitting diodes 125 that extend along one of the long edges of the lightguide 115, e.g., edge 105, to produce light that propagates in the lightguide 115. As illustrated, the light emitting diodes 125 are separated from the edge 105 of the lightguide 115 by an air gap 191. In an example embodiment, the air gap 191 may be at least twice the thickness of the lightguide 115 measured between the first major surface 111 and the second major surface 113. In other words, the air gap 191 may be at least twice the width of one of the shorter edges (117, 119). However, in other example embodiments, the air gap 191 may be less than twice the thickness of the lightguide 115 measured between the major surfaces (111, 113) without departing from a broader scope of the present disclosure. For example, the air gap 191 may be at least the thickness of the lightguide 115 in some embodiments.

In an example embodiment, the light emitting diodes 125 are mounted to a circuit board, which along with other elements illustrated in FIG. 1A are supported by a frame of a luminaire. Accordingly, the lighting system 100 can comprise a luminaire used for overhead illumination or some other appropriate form of lighting application. The circuit board and the frame mentioned above are not shown in the figures so as to avoid unnecessarily obscuring certain relevant elements of the lighting fixture such as the light emitting diodes 125, optic 110, and the lightguide 115.

Furthermore, as illustrated, the lighting system 100 includes an optic 103 that couples light across the air gap and into the lightguide 115 via the edge 105. In the illustrated embodiment, the optic 103 comprises two reflective surfaces 110, for example a pair of mirrors that face one another. The optic 103 is configured to receive and securely retain the edge 105 of the lightguide 115 between the two reflective surfaces 110 adjacent one end 153 of the two reflective surfaces 110 such that the edge 105 is enclosed on two opposite sides by the two reflective surfaces 110. The end 153 of the reflective surfaces 110 at which the edge 105 of the lightguide 115 is received and retained may be referred to as the lightguide receiving end. As illustrated, the light emitting diodes 125 are disposed adjacent an opposite end 155 of the two reflective surfaces 110 of the optic 103, which may be referred to as a light source receiving end.

Figure 1D:
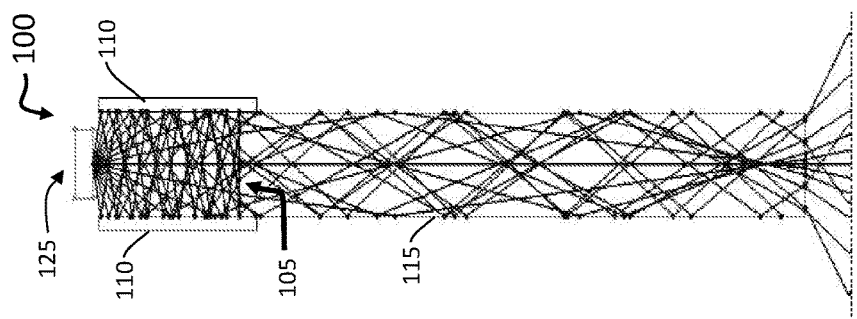
Figure 1C:
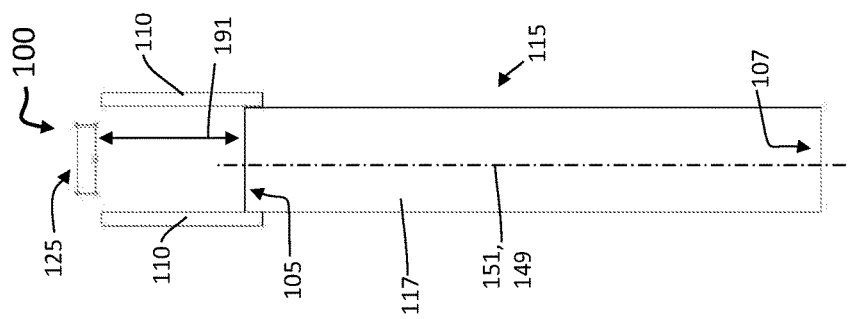

As best seen in the ray traces of FIG. 1D, the reflective surfaces 110 guide the light from the light emitting diodes 125 disposed adjacent the light source receiving end 155 of the optic 103 to the edge 105 of the lightguide 115 that is disposed at the lightguide receiving end 153 of the optic 103. The light then couples into the lightguide 115 and is guided via total internal reflection towards an opposing edge 107. Light emits from the opposing edge 107 to form a useful pattern of illumination. In some example embodiments, light may also be emitted from the major surfaces (111, 113).

Figure 2B:
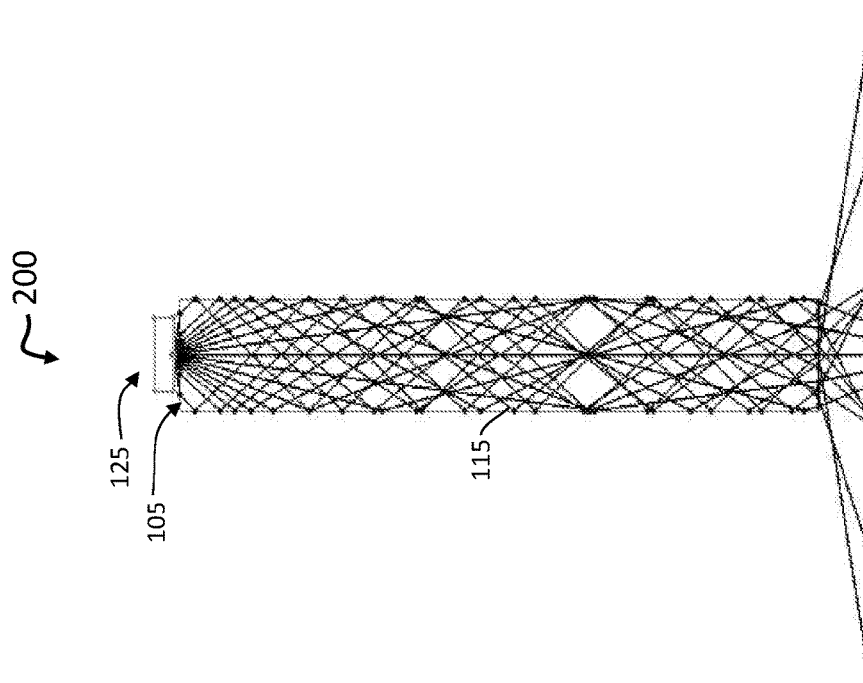
FIGS. 2A and 2B (collectively FIG. 2) illustrate two cross sectional views of another lighting system 200.
Figure 2A:
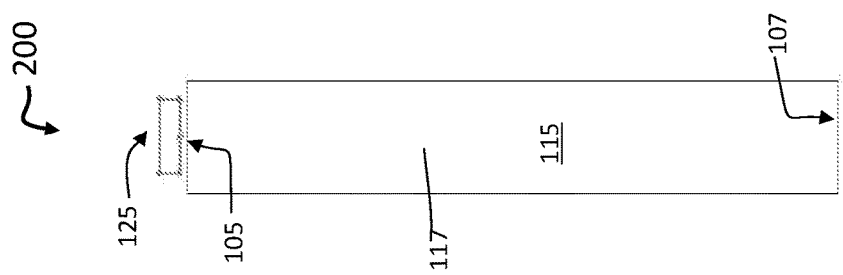

As best seen by comparing the ray traces illustrated in FIG. 1D for the lighting system 100 with the ray traces illustrated in FIG. 2B for the lighting system 200, the lighting systems 100, 200 have different illumination output patterns. As illustrated, the vertical displacement of the light emitting diodes 125 from the edge 105 of the lightguide 115 and the resulting air gap 191 together with the reflectors 110 that couple light across the air gap 191 influence the pattern of illumination output by the lighting system 100. The configuration of FIG. 1 results in an illumination pattern (shown in FIG. 1D) that is more concentrated or diverges less rapidly at the opposing edge 107 than the configuration of FIG. 2 (shown in FIG. 2B).

Figure 3B:
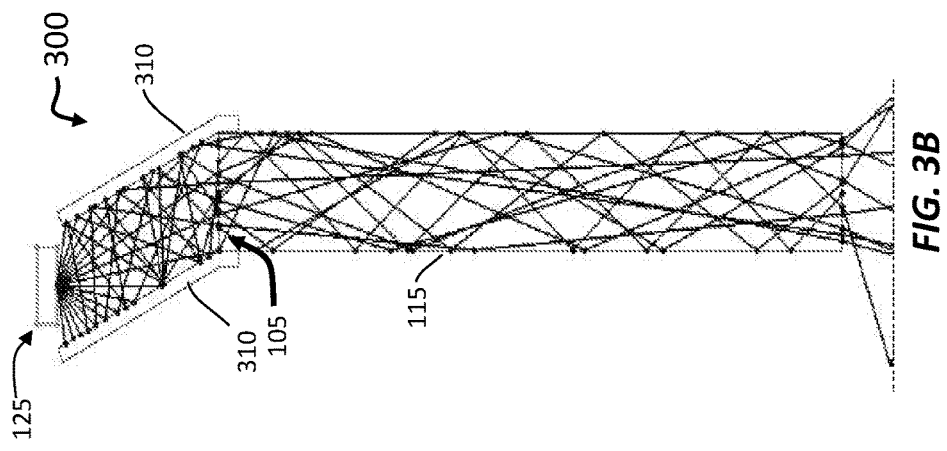
FIGS. 3A and 3B (collectively FIG. 3) illustrate two cross sectional views of another lighting system 300.
Figure 3A:
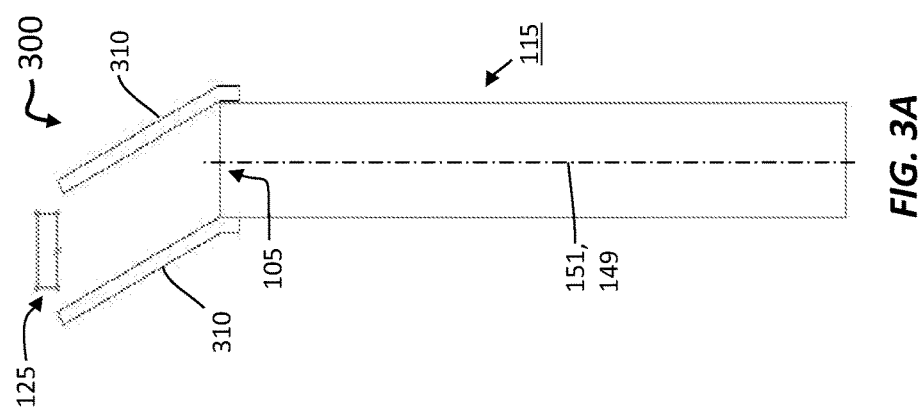

Turning now to FIG. 3, another embodiment is illustrated in which the row of light emitting diodes 125 is displaced laterally from the centerline 151 of the lightguide 115. A plane through the centerline 151 such that it bisects the lightguide equally along the width of the shorter edges (117, 119) may be referred to as a reference plane 149. In one example embodiment, the light emitting diodes 125 may be offset from the reference plane 149 or the centerline 151 by at least one-half of the thickness of the optic 115. However, in other example embodiments, the light emitting diodes 125 may be offset from the reference plane 149 or the centerline 151 by less than one-half of the thickness of the optic 115 without departing from a broader scope of the present disclosure. For example, the light emitting diodes 125 may be offset from the reference plane 149 or the centerline 151 by at least one-fourth of the thickness of the optic 115 in some embodiments.

An optic 301 guides the light from the light emitting diodes 125, in their displaced position, to the edge 105 of the lightguide 115. In the illustrated embodiment, the optic 301 comprises two reflective surfaces 310 that face one another. As illustrated, the two reflective surfaces 310 can comprise sheets of reflective material that are canted. Further, the canted sheets are bent at the corners: (a) to facilitate mechanical alignment of the lightguide 115, (b) to receive and securely retain the edge 105 of the lightguide 115, and/or (c) to promote efficient light transfer from the light emitting diodes 125 to the edge 105 of the lightguide 115. In particular, one of the reflective surfaces 310 may be bent adjacent the first corner 181, while the other reflective surface 310 may be bent adjacent the second corner 183.

In the illustrated embodiment, lateral offset of the light emitting diodes 125 and the canted form of the two reflective surfaces 310 launches light into the edge 105 of the lightguide 115 at an angle that causes the light to emit from the opposing lightguide edge 107 in a biased pattern of illumination. For example, the light emitted from the opposing edge 107 of the lightguide 115 diverges more rapidly towards the side of the centerline 151 where the light emitting diodes 125 are positioned than on the opposite side. Alternatively, the light emitted from the opposing edge 107 may be biased towards to opposite side of the centerline 151 or reference plane 149 (i.e., side opposite to which light emitting diodes 125 are positioned). Accordingly, the resulting illumination pattern is asymmetric with respect to the reference plane 149 that is positioned to bisect the lightguide 115 into two equally sized panels (of equal thickness). The two illumination pattern portions on the two sides of that reference plane can have different intensities, different divergence characteristics, and/or different angular content of light rays, for example.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:
1. A lighting system comprising:
a lightguide comprising:
   a first face;
   a second face that is opposite the first face; and
   an edge that extends between the first face and the second face,
   wherein the first face and the second face extend along a reference plane that is disposed midway between the first face and the second face and that extends through the edge;
a row of light emitting diodes that are separated from the edge by an air gap, that extend along the edge, and that are configured to emit light; and
a plurality of reflective surfaces that extend along the row of light emitting diodes and are oriented to guide the emitted light across the air gap to couple the guided light into the lightguide via the edge,
   wherein the first face and the edge form a first corner,
   wherein the second face and the edge form a second corner,
   wherein the plurality of reflective surfaces comprises:
      a first reflective surface of a first reflective sheet that extends between the row of light emitting diodes and the first corner; and
      a second reflective surface of a second reflective sheet that extends between the row of light emitting diodes and the second corner,
   wherein the first reflective surface and the second reflective surface extend substantially parallel to one another,
   wherein the first reflective sheet is bent adjacent the first corner, and
   wherein the second reflective sheet is bent adjacent the second corner.

2. The lighting system of claim 1, wherein the lightguide further comprises a second edge that is disposed opposite the edge, and
   wherein the first face and the second face are operative to guide the coupled light towards the second edge so that at least a portion of the coupled light exits the lightguide via the second edge.

3. The lighting system of claim 2, wherein the portion of the coupled light that exits the lightguide via the second edge forms an illumination pattern that is laterally biased relative to the reference plane.

4. The lighting system of claim 1, wherein the first face and the second face are separated from one another by a thickness, and
   wherein the row of light emitting diodes are offset from the reference plane by at least one-half of the thickness.

5. The lighting system of claim 4, wherein the air gap is at least twice the thickness.

6. The lighting system of claim 1, wherein the lightguide comprises a polymeric optical material disposed between the first face and the second face.

7. A lighting system comprising:
   a lightguide that comprises a panel of optical material extending along a reference plane, the panel comprising:
      a first face;
      a second face that is opposite the first face;
      a first edge that extends between the first face and the second face; and
      a second edge that is opposite the first edge and that extends between the first face and the second face,
      wherein the first face extends along a first side of the reference plane and the second face extends along a second side of the reference plane, with the reference plane disposed midway between the first face and the second face so that the reference plane extends through the first edge and the second edge;
   a row of light emitting diodes disposed adjacent the first edge, with an air gap disposed between the row of light emitting diodes and the first edge, wherein the row of light emitting diodes is disposed on the first side of the reference plane; and
   an optic that is disposed between the row of light emitting diodes and the first edge to couple light from the row of light emitting diodes through the first edge and into the lightguide, so that at least a portion of the coupled light propagates in the lightguide via internal reflection between the first face and the second face to pass through the second edge and exit the lightguide to create a light distribution that is biased relative to the reference plane,
      wherein the optic comprises a first reflective surface and a second reflective surface that are substantially parallel to each other, and
      wherein the first reflective surface is bent adjacent a first corner defined by the first face and the first edge and the second reflective surface is bent adjacent a second corner defined by the second face and the first edge.

8. The lighting system of claim 7, wherein the light distribution is biased on the first side of the reference plane.

9. The lighting system of claim 7, wherein the light distribution is biased on the second side of the reference plane.

10. The lighting system of claim 7, wherein the light distribution has a first intensity on the first side the reference plane and a second intensity on the second side of the reference plane, and
    wherein the first intensity is higher than the second intensity.

11. The lighting system of claim 7, wherein the light distribution has a first intensity on the first side of the reference plane and a second intensity on the second side of the reference plane, and
    wherein the second intensity is higher than the first intensity.

12. The lighting system of claim 7, wherein the light distribution comprises:
    a first light distribution portion on the first side of the reference plane; and
    a second light distribution portion on the second side of the reference plane, and
    wherein the first light distribution diverges from the reference plane at a greater angle than the second light distribution diverges from the reference plane.

13. The lighting system of claim 7, wherein the optic comprises a pair of reflectors, wherein a first reflector of the pair of reflectors comprises the first reflective surface and a second reflector of the pair of reflectors comprises the second reflective surface.

14. The lighting system of claim 7, wherein the optic comprises two mirrors that extend between the row of light emitting diodes and the first edge, wherein a first mirror of the two mirrors comprises the first reflective surface and a second mirror of the two mirrors comprises the second reflective surface.

15. The lighting system of claim 7, wherein the first face is displaced from the second face by a distance,
    wherein the row of light emitting diodes is displaced from the first edge at least by the distance, and
    wherein the row of light emitting diodes is displaced from the reference plane by at least half of the distance.

16. The lighting system of claim 7, wherein the panel of optical material has a thickness, and
    wherein the row of light emitting diodes is offset laterally from the reference plane by at least one fourth of the thickness.

17. A lighting system comprising:
    a lightguide comprising:
       a first face;
       a second face that is opposite the first face; and
       an edge that extends between the first face and the second face,
    a row of light emitting diodes that are separated from the edge by an air gap, that extend along the edge, and that are configured to emit light; and
    a plurality of reflective surfaces that extend along the row of light emitting diodes and are oriented to guide the emitted light across the air gap to couple the guided light into the lightguide via the edge,
       wherein the plurality of reflective surfaces comprise a first reflective surface and a second reflective surface that are substantially parallel to each other, and
       wherein the first reflective surface is bend adjacent a first corner defined by the first face and the edge and the second reflective surface is bent adjacent a second corner defined by the second face and the edge.

\* \* \* \* \*